(No Model.)

F. H. CHAPMAN.
COFFEE MILL.

No. 253,264. Patented Feb. 7, 1882.

Witnesses.
Robert Everett.
Edw. G. Siggers.

Inventor.
Frank H. Chapman
By Wm H. Babcock
Atty

N. PETERS, Photo-Lithographer, Washington, D. C.

UNITED STATES PATENT OFFICE.

FRANK H. CHAPMAN, OF MERIDEN, CONNECTICUT, ASSIGNOR TO THE CHARLES PARKER COMPANY, OF SAME PLACE.

COFFEE-MILL.

SPECIFICATION forming part of Letters Patent No. 253,264, dated February 7, 1882.

Application filed December 14, 1881. (No model.)

*To all whom it may concern:*

Be it known that I, FRANK H. CHAPMAN, a citizen of the United States of America, residing at Meriden, in the county of New Haven and State of Connecticut, have invented certain new and useful Improvements in Coffee-Mills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to mills operated by hand for grinding coffee, spice, and other articles.

The nature of said invention consists in devices hereinafter described, for adjusting the grinding-surfaces to the work required.

It also consists in certain details of construction and combination hereinafter set forth.

Figure 1:
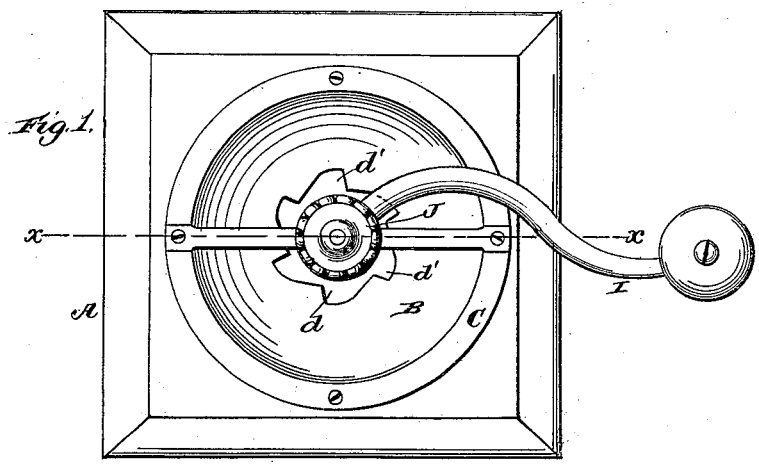
Figure 2:
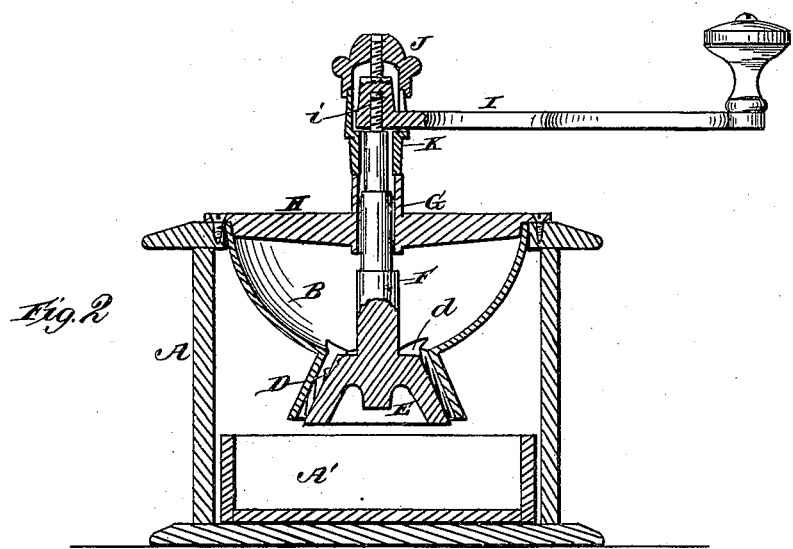
Figures 3, 4:
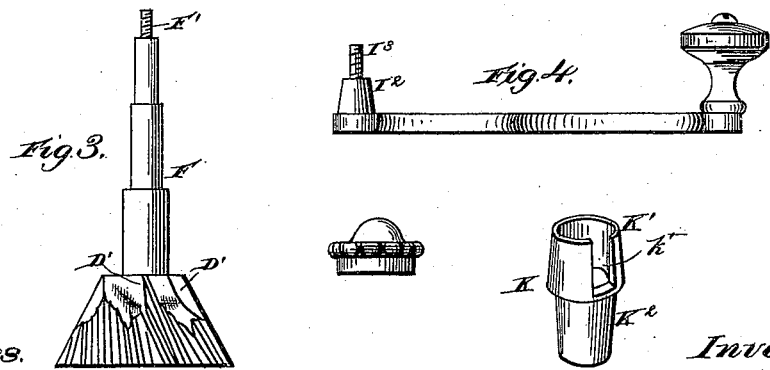

In the accompanying drawings, Figure 1 represents a plan view of my improved coffee-mill, the cover being removed. Fig. 2 represents a vertical section through the same on the line $x\ x$ of Fig. 1. Fig. 3 represents the grinding-cone or runner and the vertical shaft or spindle thereof detached from the rest of the mill; and Fig. 4 represents in detail the crank, slotted sleeve, and adjusting-nut.

The same letters indicate like parts in all the figures.

A designates the box or casing of the coffee-mill, which is provided, as usual, in its lower part with a drawer, A'. The top of said casing has a large central opening to fit a hopper, B, which is suspended within said casing by an annular flange, C, extending laterally from the rim of said hopper, and resting on the top of said casing around said central opening. Said flange is preferably cast with said hopper, and fastened to the casing by screws, or in any other convenient manner. The bottom of said hopper is in one piece, with a reversely-flaring fixed hollow grinding-cone, D, an opening, $d$, affording free passage from the interior of said hopper to the interior of said cone. The latter is dressed in oblique grooves and corrugations on its inner face. Within the said hollow cone rotates a solid cone, E, which is the runner of the grinding-mill, its face being dressed similarly to that opposed to it by hollow cone D. The opening $d$, before mentioned, through which the grains pass, is provided with a series of notches, $d'$, and the upper part of cone or runner E is provided with a corresponding series of teeth, $D'$. This construction allows the entry of the grains of coffee between the grinding-surfaces, but insures their being crushed into fragments as they do so.

F designates a vertical shaft or spindle, which is cast with cone or runner E, and extends upward therefrom through a hollow bearing-hub, G, that is cast with a transverse bar or bridge, H, countersunk in the upper part of hopper B and fastened thereto. On the upper end of said shaft is a screw-threaded stud or extension, $F'$, which screws into a correspondingly-threaded recess, $i$, in the under side of the inner end of the operating crank-arm I. With this inner end and on the top thereof is cast a solid slightly-tapering spindle, $I^2$, on top of which is a screw-threaded stud or pin, $I^3$, of sufficient length to allow considerable upward and downward adjustment of crank-arm I and spindle F.

J designates the adjusting-nut, which receives said screw-threaded stud, and bears against the upper end of a hollow sleeve, K. By turning this nut in one direction or the other the spindle F of runner E can be raised or lowered at will to adjust the conical face of runner E toward or from the inner face of hollow cone D. This sleeve consists of an upper part, $K'$, which receives the inner end of said crank-arm, and which is vertically slotted at $k'$, to allow the horizontal part of said arm to move up and down during the adjustment hereinbefore mentioned, and of a lower part, $K^2$, of less diameter, which rests upon bearing-hub G and incloses the upper part of spindle $I^2$. A small internal annular shoulder or offset marks the point of meeting of said parts of the sleeve or casting K. The object of the above-mentioned adjustment is to adapt the same mill to operate upon grains of different sizes. Thus the same mill may be at once a coffee-mill and a spice-mill, the grinding-surfaces being separated a little more when a coarse product is desired, and the distance between them lessened to secure fineness. This feature of adjustability for coarseness or fineness is not broadly new; but the mechanism above described for effecting it is an improvement on the devices hitherto used for that purpose.

My adjusting-screw and its spindle are in one piece with the operating crank-arm, and are not cast with the spindle of the runner. My sleeve K supports the entire weight of the runner and its adjusting devices, and also constitutes a valuable guide and brace for the latter.

The parts are all firmly attached, yet may be easily disconnected for cleaning.

Having thus fully described my invention, what I claim as new, and desire to secure by Letters Patent, is—

1. Crank-arm I, having screw-threaded stud $I^3$, permanently connected thereto, in combination with adjusting-nut J, slotted sleeve K, a support for said sleeve, and the detachable spindle of the runner, which is connected to said crank-arm within said sleeve.

2. In a coffee-mill, a crank-arm having a spindle or stud and screw formed therewith, in combination with an adjusting-nut, a slotted sleeve, means for supporting said sleeve, and the spindle F, substantially as set forth.

In testimony whereof I affix my signature in presence of two witnesses.

FRANK H. CHAPMAN.

Witnesses:
 RALPH A. PALMER,
 T. F. WHITE.